United States Patent
Yardi et al.

(10) Patent No.: US 11,636,210 B2
(45) Date of Patent: Apr. 25, 2023

(54) ARTIFICIAL REALITY SYSTEM WITH MULTI-STAGE BOOT PROCESS

(71) Applicant: Meta Platforms Technologies, LLC, Menlo Park, CA (US)

(72) Inventors: Shrirang Madhav Yardi, San Jose, CA (US); Neeraj Upasani, Redmond, WA (US); Dinesh Patil, Sunnyvale, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 211 days.

(21) Appl. No.: 17/009,512

(22) Filed: Sep. 1, 2020

(65) Prior Publication Data

US 2022/0004639 A1 Jan. 6, 2022

Related U.S. Application Data

(60) Provisional application No. 63/047,066, filed on Jul. 1, 2020.

(51) Int. Cl.
*G06F 15/177* (2006.01)
*G06F 9/00* (2006.01)
*G06F 21/57* (2013.01)
*G06F 1/04* (2006.01)
*G06F 21/55* (2013.01)
(Continued)

(52) U.S. Cl.
CPC .............. *G06F 21/575* (2013.01); *G06F 1/04* (2013.01); *G06F 21/552* (2013.01); *G06F 21/62* (2013.01); *G06F 21/64* (2013.01); *G06F 21/74* (2013.01); *G06F 3/011* (2013.01); *G06F 2221/034* (2013.01)

(58) Field of Classification Search
CPC ........ G06F 21/575; G06F 1/04; G06F 21/552; G06F 21/62; G06F 21/64; G06F 21/74; G06F 3/011; G06F 2221/034; G06F 1/163; G06F 1/1686; G06F 3/012; G06F 3/017; G06F 3/0304; G06F 9/4401; G06F 9/4411
See application file for complete search history.

(56) References Cited

U.S. PATENT DOCUMENTS 10,410,202 B1    9/2019  Ng et al.
2011/0107424 A1* 5/2011  Singh ................. H04L 67/10
                                                726/24
(Continued)

OTHER PUBLICATIONS

International Search report and Written Opinion for International Application No. PCT/US2021/038818, dated Oct. 8, 2021, 9 pages.
(Continued)

*Primary Examiner* — Xuxing Chen
(74) *Attorney, Agent, or Firm* — Shumaker & Sieffert, P.A.

(57) ABSTRACT

Techniques are described for improving security of a boot sequence of a system, such as an artificial reality system. In some examples, a method includes configuring, by a boot sequencing system, attack detection circuitry based on configuration information accessed from a first storage device; after configuring the attack detection circuitry, starting, by the boot sequencing system, a root of trust processor to initiate a boot sequence; enabling access, by the root of trust processor during the boot sequence, to secret information stored in a second storage device.

18 Claims, 9 Drawing Sheets

(51) Int. Cl.
    *G06F 21/62*     (2013.01)
    *G06F 21/74*     (2013.01)
    *G06F 21/64*     (2013.01)
    *G06F 3/01*     (2006.01)

(56) References Cited

U.S. PATENT DOCUMENTS

| | | | |
|---|---|---|---|
| 2013/0055230 A1* | 2/2013 | Kim | G06F 21/572 |
| | | | 717/168 |
| 2016/0092387 A1* | 3/2016 | Balasubramanian | |
| | | | G06F 13/404 |
| | | | 710/110 |
| 2016/0300064 A1 | 10/2016 | Stewart et al. | |
| 2017/0147356 A1 | 5/2017 | Kotary et al. | |
| 2017/0246466 A1* | 8/2017 | Murphy | A61N 1/3975 |
| 2018/0004505 A1 | 1/2018 | Annapureddy et al. | |
| 2019/0140852 A1 | 5/2019 | Kreft | |
| 2019/0384348 A1* | 12/2019 | Srinivasan | G06F 1/3203 |
| 2020/0257798 A1* | 8/2020 | Rao | G06F 21/556 |

OTHER PUBLICATIONS

U.S. Appl. No. 16/795,254, filed Feb. 19, 2020, naming inventors Clark-Lindh et al.

International Preliminary Report on Patentability for International Application No. PCT/US2021/038818, dated Jan. 12, 2023, 7 pages.

\* cited by examiner

ARTIFICIAL REALITY SYSTEM WITH MULTI-STAGE BOOT PROCESS

CROSS REFERENCE

This application claims the benefit of U.S. Provisional Patent Application No. 63/047,066, filed Jul. 1, 2020, the entire contents of which are incorporated herein by reference.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, techniques are described for improving security of a pre-boot sequence and boot sequence of a system, such as a system on a chip ("SoC"). The techniques may be implemented in Augmented Reality/Virtual Reality system devices, such as a peripheral device operating as a co-processing AR/VR device when paired with one or more head-mounted displays (HMDs) and configured to display virtual content. For example, the peripheral device and each HMD may each include one or more SoC integrated circuits configured to support artificial reality/virtual reality applications. Such SoCs may include those operating as or supporting a co-application processor, sensor aggregator, display SoC, etc. The boot sequence for processors, whether operating independently or as part of a SoC, may involve a multi-stage boot process that is designed to protect the SoC from attempts to compromise the integrity and/or security of the boot process or the SoC itself. Such a boot sequence may encompass both a pre-boot sequence and secure boot sequence, enabling protection for the SoC during a timeframe that ranges from the SoC being in a powered-down condition to a condition in which the SoC is powered on and in a steady state functional mode.

There a number of places during the boot process where SoCs described herein could be vulnerable to attack, such as by a malicious actor or process. Such attacks, if successful, may result in data or secret information (e.g., cryptographic keys) being compromised, erroneous or insecure operation of the artificial reality system, or other effects. Attacks may take any of a number of forms, including physical intervention attacks, voltage glitching attacks, clock or frequency glitching attacks, temperature attacks, or other types of attacks. Accordingly, before an SoC is placed in a position to execute instructions, a pre-boot process may be employed to ensure that such attacks are not successful, or at least are less likely to be successful.

In some examples, a boot process as described herein may involve multiple stages, enabling access to data less likely to enable attacks during early stages, before some or all of the defenses to potential attacks are in place. Once such defenses are in place, later stages may proceed, and such later stages may involve access to the more critical data stored within the SoC. By performing a pre-boot stage and/or a multi-staged secure boot process, the SoC is less likely to be susceptible to attacks that may compromise its operation, or that may compromise sensitive information stored within the SoC. Such sensitive information may include confidential information and/or information that, if revealed, might be hazardous to the operation of the SoC. The techniques described herein may be applied in combination with other processes for securing boot sequence(s) for the SoC processor, including those relating to verifying the validity of firmware provided to the application processor during a boot sequence.

In some examples, this disclosure describes operations performed by an SoC in accordance with one or more aspects of this disclosure. In one specific example, this disclosure describes a method comprising configuring, by a boot sequencing system, attack detection circuitry based on configuration information accessed from a first storage device; after configuring the attack detection circuitry, starting, by the boot sequencing system, a root of trust processor to initiate a boot sequence; and enabling access, by the root of trust processor during the boot sequence, to secret information stored in a second storage device.

In another example, this disclosure describes a system comprising a processor; attack detection circuitry; a first storage device; a second storage device; and a boot sequencer configured to: configure the attack detection circuitry based on information accessed from the first storage device, after configuring the attack detection circuitry, start the processor, and enable access, by the processor, to secure data stored in the second storage device.

In another example, this disclosure describes a system comprising a first clock; a second clock; attack detection circuitry; a storage device; and a boot sequencer configured to: configure, while being clocked by the first clock, the attack detection circuitry based on configuration information stored in the storage device, configure, while being clocked by the first clock, the second clock based on trim information stored in the storage device, and after configuring the second clock, select the second clock for use in further boot sequencing operations.

In another example, this disclosure describes a computer-readable storage medium comprising instructions that, when executed, configure processing circuitry of a computing system to perform any of the methods of the claims recited herein or any of the processes, techniques, or procedures described herein.

In another example, an artificial reality system comprises a storage device; and one or more processors connected to the storage device and configured to perform any of the methods of the claims recited herein or any of the processes, techniques, or procedures described herein.

Other examples include methods, devices, devices comprising means, and computer-readable storage media for performing any of the methods of the claims, or any of the processes, techniques, or procedures described herein.

Further details of one or more examples of this disclosure are set forth in the accompanying drawings and in the description below. Other features, objects, and advantages will be apparent from the description and drawings, and from the claims.

DETAILED DESCRIPTION

Figure 1A:
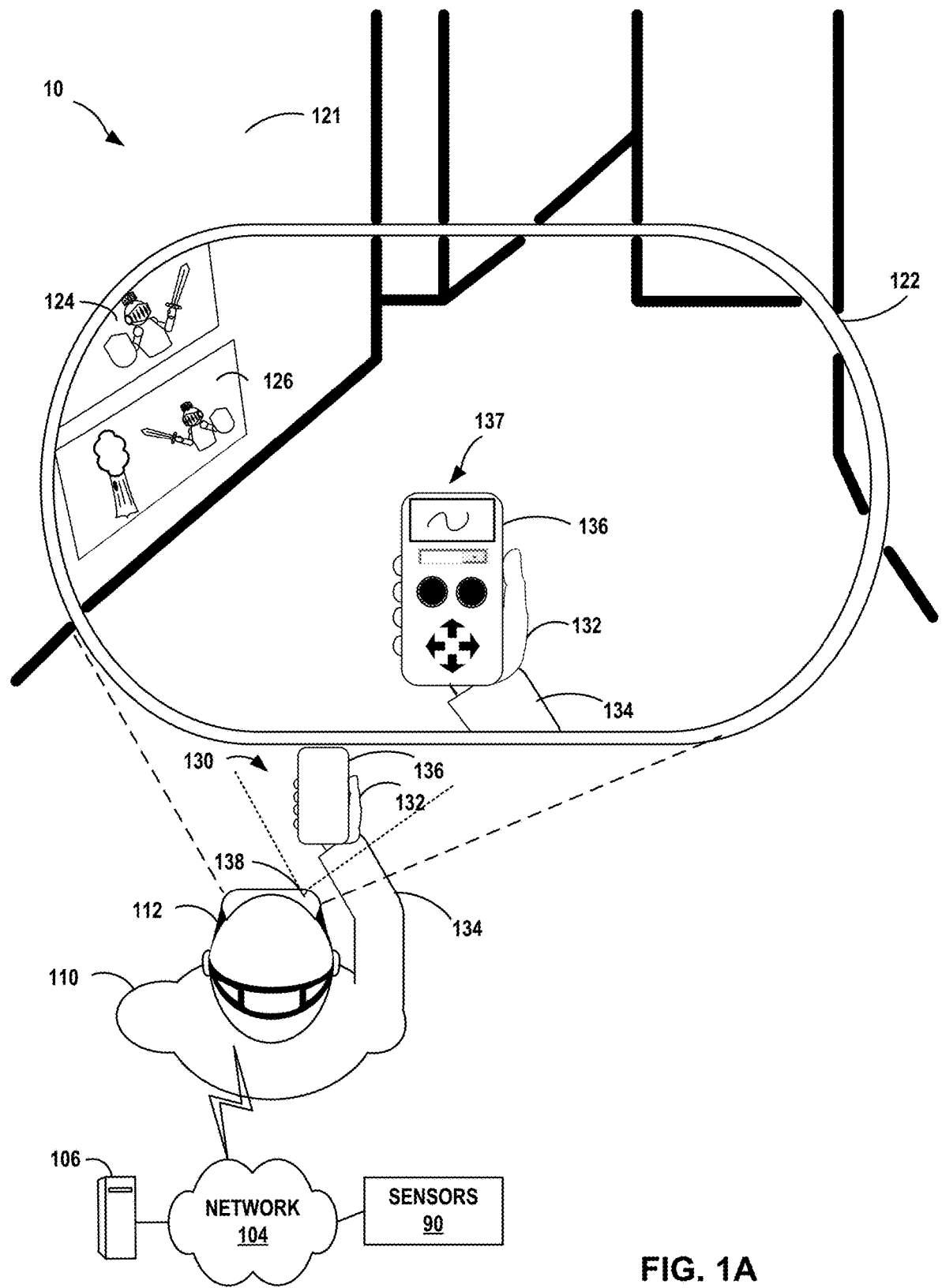
FIG. 1A is a block diagram depicting an example multi-device artificial reality system that facilitates secure booting of a system, in accordance with the techniques described in this disclosure.

FIG. 1A is a block diagram depicting an example multi-device artificial reality system that facilitates secure booting of an artificial reality system, in accordance with the techniques described in this disclosure. In the example of FIG. 1A, artificial reality system 10 includes HMD 112, peripheral device 136, and may in some examples include one or more external sensors 90 and/or console 106.

The boot process for loading and executing an artificial reality system presents opportunities for SoCs described herein to be vulnerable to attack. Such attacks may result in data or secret information being disclosed, or may result in improper or insecure operation of the artificial reality application. Attacks may involve physical intervention attacks (e.g., modifying signals at external pins or sensing or interacting with internal components), voltage glitching attacks, clock or frequency glitching attacks, temperature attacks, or other types of attacks. Accordingly, before an SoC is placed in a position to execute instructions, a secure pre-boot process may operate to ensure that such attacks are not successful.

In some examples, a boot process as described herein may enable access to less critical data during early stages, before some or all of the defenses to potential attacks are in place. Access to more critical data increases the likelihood of successful attacks. Once such defenses are in place, later stages involve access to the more critical data stored within the SoC. By performing a pre-boot stage and/or a multi-staged secure boot process, the SoC is less likely to be susceptible to attacks that may compromise its operation, or that may compromise the sensitive (i.e., confidential and/or operationally important) information stored within the SoC.

The techniques described herein may be applied in combination with other processes for securing the boot sequence for an SoC, including those relating to verifying the validity of firmware provided to the application processor during a boot sequence. Such techniques for verifying the validity of firmware and other details relating to boot processes are available in U.S. patent application Ser. No. 16/795,254, filed Feb. 19, 2020, and entitled "Artificial Reality System With Verified Boot Sequences", the entire content of which is incorporated herein by reference.

A typical boot sequence for loading and executing an SoC presents opportunities for misappropriating secret information. For instance, an attacker may engage in voltage or frequency glitching attacks on an SoC. Inappropriate or out-of-range voltages may be applied to pins of an SoC during the boot sequence in an attempt to derail the boot sequence and place the SoC in an unknown or vulnerable state. In another example, the frequency of a clock used within the SoC could be modified or even stopped at critical points during the boot process. If stopped at a vulnerable time, a careful analysis of the internal electrical and physical properties of the SoC may lead to revealing the contents of critically sensitive or confidential information stored in the SoC.

As shown in FIG. 1A, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application might not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136.

As described above, multiple devices of artificial reality system 10 may work in conjunction in the AR environment, where each device may be a separate physical electronic device and/or separate integrated circuits (e.g., System on a Chip (SOC)) within one or more physical devices. In this example, peripheral device 136 is operationally paired with HMD 112 to jointly operate within AR system 10 to provide an artificial reality experience. For example, peripheral device 136 and HMD 112 may communicate with each other as co-processing devices. As one example, when a user performs a user interface gesture in the virtual environment at a location that corresponds to one of the virtual user interface elements of virtual user interface 137 overlaid on the peripheral device 136, the AR system 10 detects the user interface gesture and performs an action that is rendered to HMD 112.

In some example implementations, as described herein, peripheral device 136 and HMD 112 may each include one or more System on a Chip (SoC) integrated circuits configured to support an artificial reality/virtual reality application, such as SoCs operating as co-application processors, sensor aggregators, display controllers, etc. The boot sequence for the above-mentioned artificial reality/virtual reality system may involve a multi-stage boot sequence, in which procedures described herein are deployed to prevent misappropriation of secret data (e.g., cryptographic keys) stored within the SoC and to prevent other attacks on the SoC. When peripheral device 136 and/or HMD 112 are powered on, peripheral device 136 and/or HMD 112 may initiate SoC boot sequences in multiple stages when booting (e.g., secure booting) corresponding artificial reality systems.

In accordance with the techniques of this disclosure, an SoC of artificial reality system 10 may perform a multi-staged boot process for an SoC of artificial reality system 10. Such a process may reduce the likelihood of misappropriation of key or secret information stored within the SoC. For example, the SoC may perform a pre-boot stage, in which defenses to potential attacks on the SoC are put in place. Such a pre-boot stage may involve enabling access to some information stored within the SoC, but the information accessed during the pre-boot stage might not be critically confidential information; while it may be important to protect the integrity of the information used during the pre-boot stage, disclosure of such information outside of the SoC is less likely to compromise the security and operation of the SoC as a whole. Once the defenses to potential attacks on the SoC are in place, the SoC may perform a boot stage or a secure boot stage, enabling access to and use of the more critically sensitive and/or confidential information stored within the SoC. Attacks seeking access to the critically sensitive and/or confidential information are thus less likely to succeed since such attacks must successfully overcome the defenses in place to prevent them.

Figure 1B:
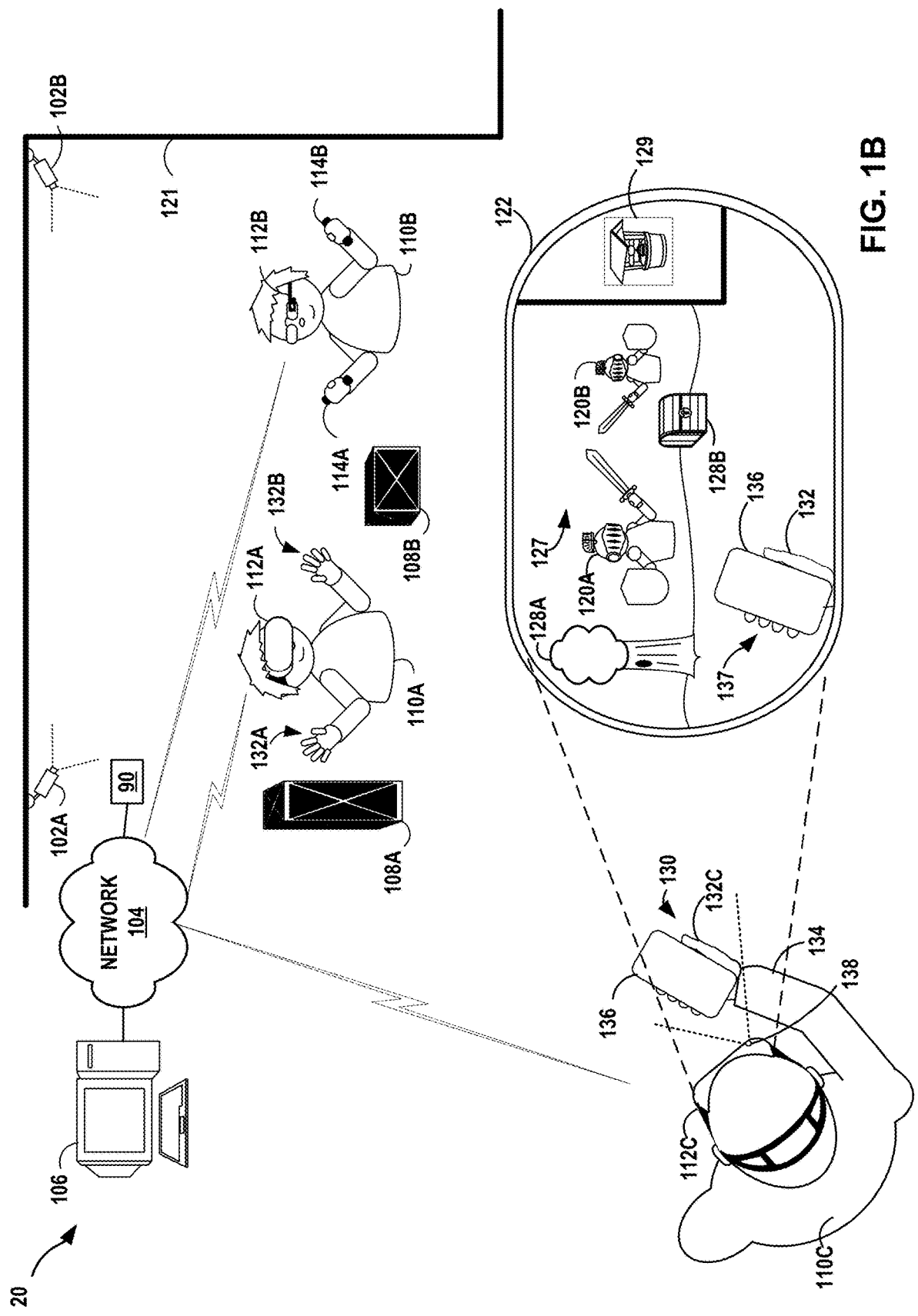
FIG. 1B is a block diagram depicting an example multi-device artificial reality system that facilitates secure booting of a system, in accordance with techniques described in this disclosure.

FIG. 1B is a block diagram depicting an example multi-device artificial reality system that facilitates secure booting of an SoC in accordance with the techniques described in this disclosure. Similar to artificial reality system 10 of FIG. 1A, in some examples, artificial reality system 20 of FIG. 1B may generate and render virtual content items with respect to a virtual surface within a multi-user artificial reality environment. Artificial reality system 20 may also, in various examples, generate and render certain virtual content items and/or graphical user interface elements to a user in response to detection of one or more particular interactions with peripheral device 136 by the user. For example, the peripheral device 136 may act as a stage device for the user to "stage" or otherwise interact with a virtual surface.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 111A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is paired with HMD 112C to jointly operate within AR system 20. Similarly, controllers 114 are paired with HMD 112B to jointly operate within AR system 20. Peripheral device 136, HMDs 112, and controllers 114 may each include one or more SoC integrated circuits configured to enable an operating environment for artificial reality applications. When devices are first powered on, the devices may initiate a secure boot wrapper for use when booting artificial reality system. When the controllers 114 and HMD 112B are powered on and perform a secure boot, each of the devices may mutually authenticate the SoCs of the devices based on the pairing certificate stored in the NVM of each device.

In accordance with the techniques of this disclosure, an SoC of artificial reality system 20 may manage a boot sequence of artificial reality system 20 to prevent access to secure information during the boot process and to otherwise improve boot sequence security. For example, the SoC may perform a pre-boot stage, in which defenses to potential attacks on the SoC are put in place and less sensitive and/or confidential information is accessed. Once the defenses to potential attacks on the SoC are in place, the SoC may perform a boot stage or a secure boot stage, enabling access to and use of the more critically sensitive and/or confidential information stored within the SoC. Attacks seeking access to the critically sensitive and/or confidential information or otherwise seeking to compromise the SoC are thus less likely to succeed since such attacks must successfully overcome the defenses in place to prevent such attacks.

Figure 2A:
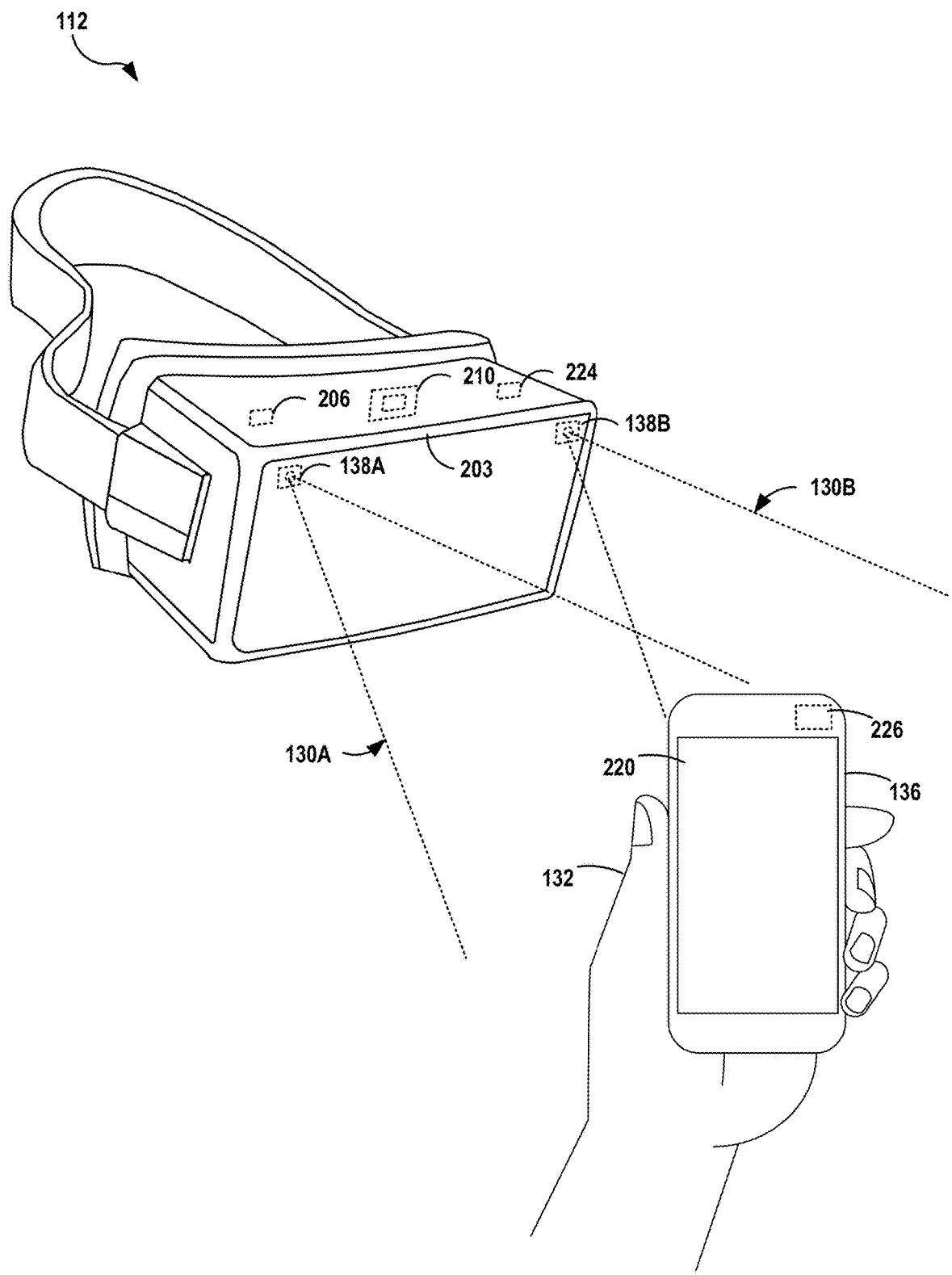
FIG. 2A is a block diagram depicting an example HMD and an example peripheral device that facilitates secure booting of a system capable of executing artificial reality applications, in accordance with techniques described in this disclosure.

FIG. 2A is an illustration depicting an example HMD 112 and an example peripheral device 136 that provide secure, privacy-preserving device attestation and mutual authentication, in accordance with techniques described in this disclosure. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial reality system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In some examples, HMD 112 includes a security processor 224 for secure device attestation and mutual authentication of HMD 112 and other devices of the AR system. When HMD 112 is powered on and performs a secure boot, security processor 224 may authenticate SoCs of HMD 112 as HMD 112 loads applicable firmware. Security processor 224 may establish a secure communication channel between HMD 112 and peripheral device 136. In one example, peripheral device 136 includes a security processor 226 for secure device attestation and mutual authentication of peripheral device 136 and other devices of the AR system. When peripheral device 136 is powered on and performs a secure boot, security processor 226 may authenticate SoCs of peripheral device 136 as an application processor in peripheral device 136 loads applicable firmware. As described above, security processor 226 may establish a secure communication channel between peripheral device 136 and HMD 112.

In accordance with the techniques of this disclosure, an SoC of peripheral device 136 may manage a boot sequence of peripheral device 136 to prevent access to secure information during the boot process and to otherwise improve boot sequence security. For example, the SoC may perform a pre-boot stage, in which defenses to potential attacks on the SoC are put in place and less confidential information (e.g., configuration information) is accessed. Once the defenses to potential attacks on the SoC are in place, the SoC may perform a boot stage or a secure boot stage, enabling access to and use of the more critically sensitive and/or confidential information stored within the SoC. The techniques described above with respect to SoCs and processors of peripheral device 136 may also be implemented in SoCs and processors of HMD 112.

Figure 2B:
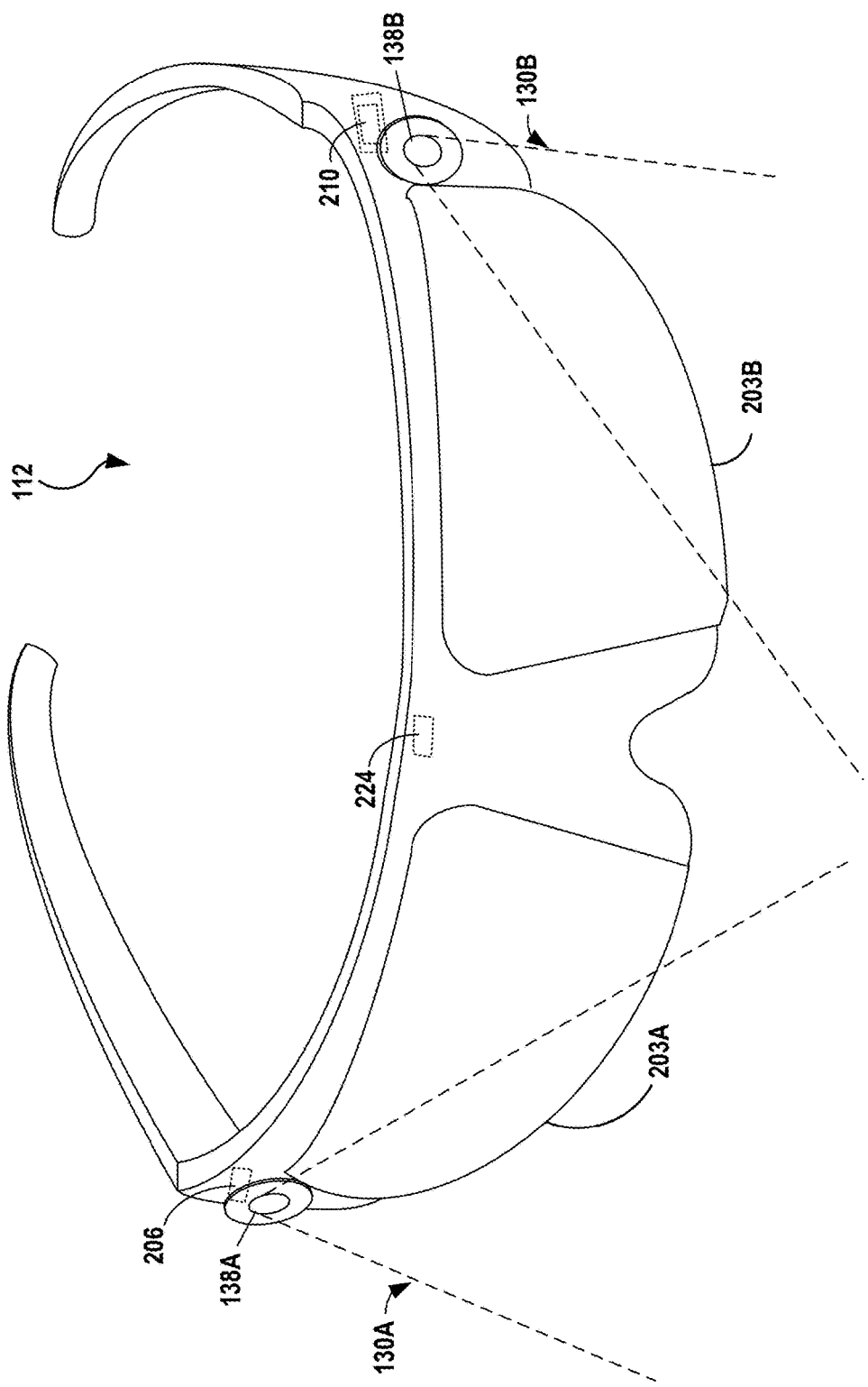
FIG. 2B is a block diagram depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIG. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203.

In accordance with the techniques of this disclosure, an SoC of peripheral device 136 may manage a boot sequence of the SoC to improve boot sequence security. For example, the SoC may perform a pre-boot stage, in which defenses to potential attacks on the SoC are put in place and less confidential information is accessed. Once the defenses to potential attacks on the SoC are in place, the SoC may perform a boot stage or a secure boot stage, enabling access to and use of the more critically confidential information stored within the SoC. The techniques described above with respect to SoCs and processors of peripheral device 136 may also be implemented in SoCs and processors of HMD 112.

Figure 3:
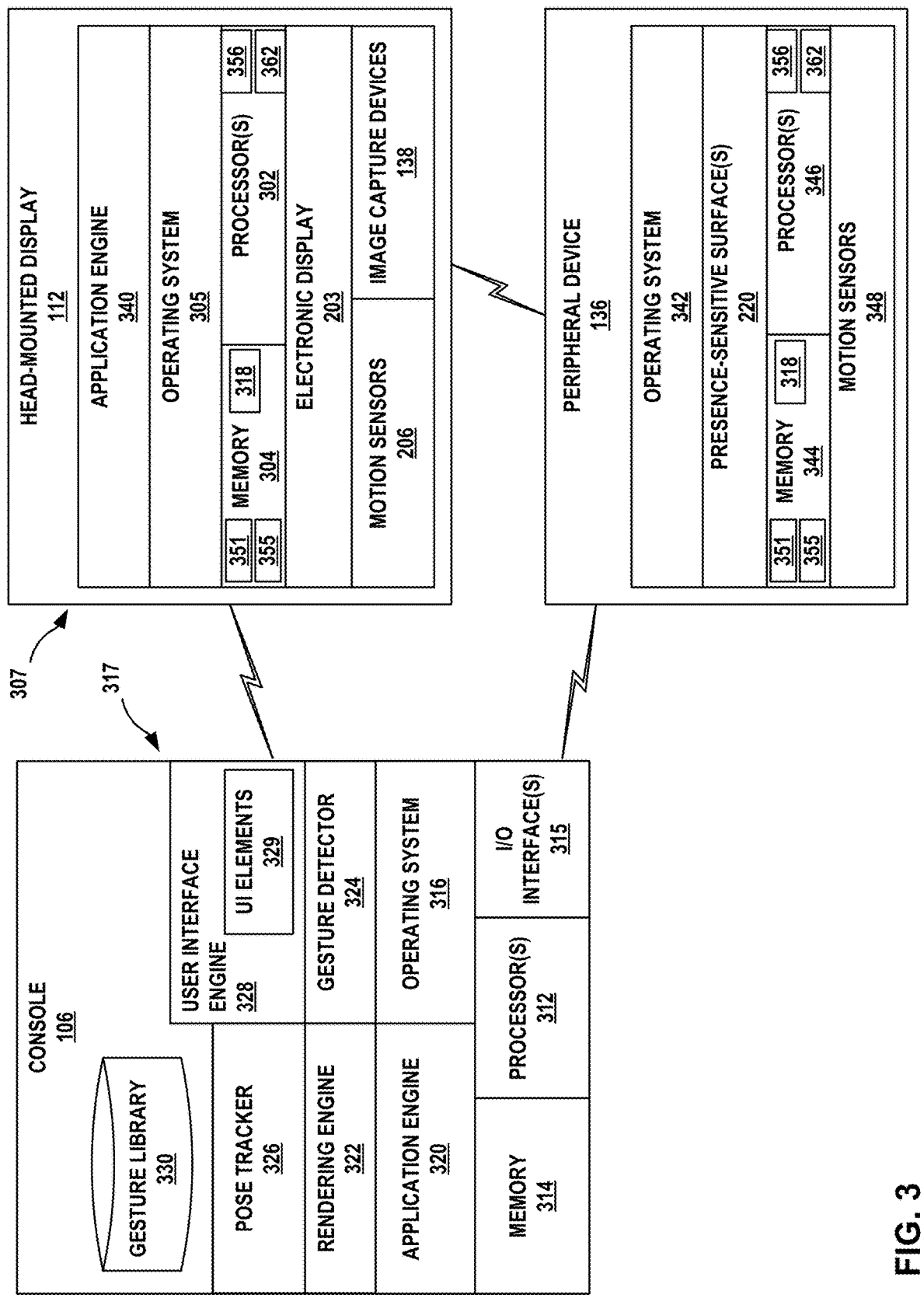
FIG. 3 is a block diagram showing example implementations of a console, an HMD, and a peripheral device of the multi-device artificial reality systems of FIG. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras 102 (FIG. 1B) and/or image capture devices 138 HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software components 317 of console 106 operate to provide an overall artificial reality application. In this example, software components 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, overtime, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software components 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 346 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 346) and communicate the touch and/or hover input and communicate information about that input (including location information about that input) to console 106 and/or HMD 112. As discussed with respect to the example of FIG. 2A, presence-sensitive surface(s) 220 can comprise a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 346 are coupled to presence-sensitive surface(s) 220 and motion sensors 246. In some examples, processors 346 and memory 344 may be separate, discrete components. In other examples, memory 344 may be on-chip memory collocated with processors 346 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

In some examples, each of processors 302, 312, 346 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

In accordance with the techniques described herein, the multi-device artificial reality system of FIG. 3 facilitates secure booting of an SoC. For example, as discussed with respect to the examples of FIGS. 2A and 2B, processors 346 of peripheral device 136 may include boot processor 356 to provide security (e.g., in a boot security wrapper) for boot sequences executed by SoCs within peripheral device 136. Similarly, processors 302 of HMD 112 may include boot processor 356 to provide secure booting of SoCs included within HMD 112.

In accordance with the techniques of this disclosure, a boot sequencer within peripheral device 136 may perform a pre-boot sequence to put in place defenses to attacks against the boot processor 356 of peripheral device 136 or against critically sensitive and/or confidential information stored in storage device 355 within peripheral device 136. Such critically confidential information may include cryptographic keys and other information for use by boot processor 356.

This pre-boot stage may involve setting up mechanisms for detecting and/or defending against attacks seeking to compromise peripheral device 136. To set up such mechanisms, configuration information may be needed, and such configuration information may be stored within storage device 351 and accessed during the pre-boot stage. While it is important to maintain the integrity of the configuration information stored within storage device 351, the configuration information in storage device 351 is less confidential than the information stored in storage device 355. Accordingly, enabling access to storage device 351 before all attack detection and defense mechanisms are in place does not place peripheral device 136 at risk.

Once the mechanisms for detecting and/or defending against attacks on peripheral device 136 are in place, access to the critically confidential information stored in storage device 355 is enabled. Boot processor 356 may then read data from storage device 355 and continue the secure boot sequence. The techniques described above with respect to boot processor 356, storage devices 351 and 355, and application processor 362 of peripheral device 136 may also be implemented in a boot processor 356 and application processor 362 of HMD 112.

Figure 4:
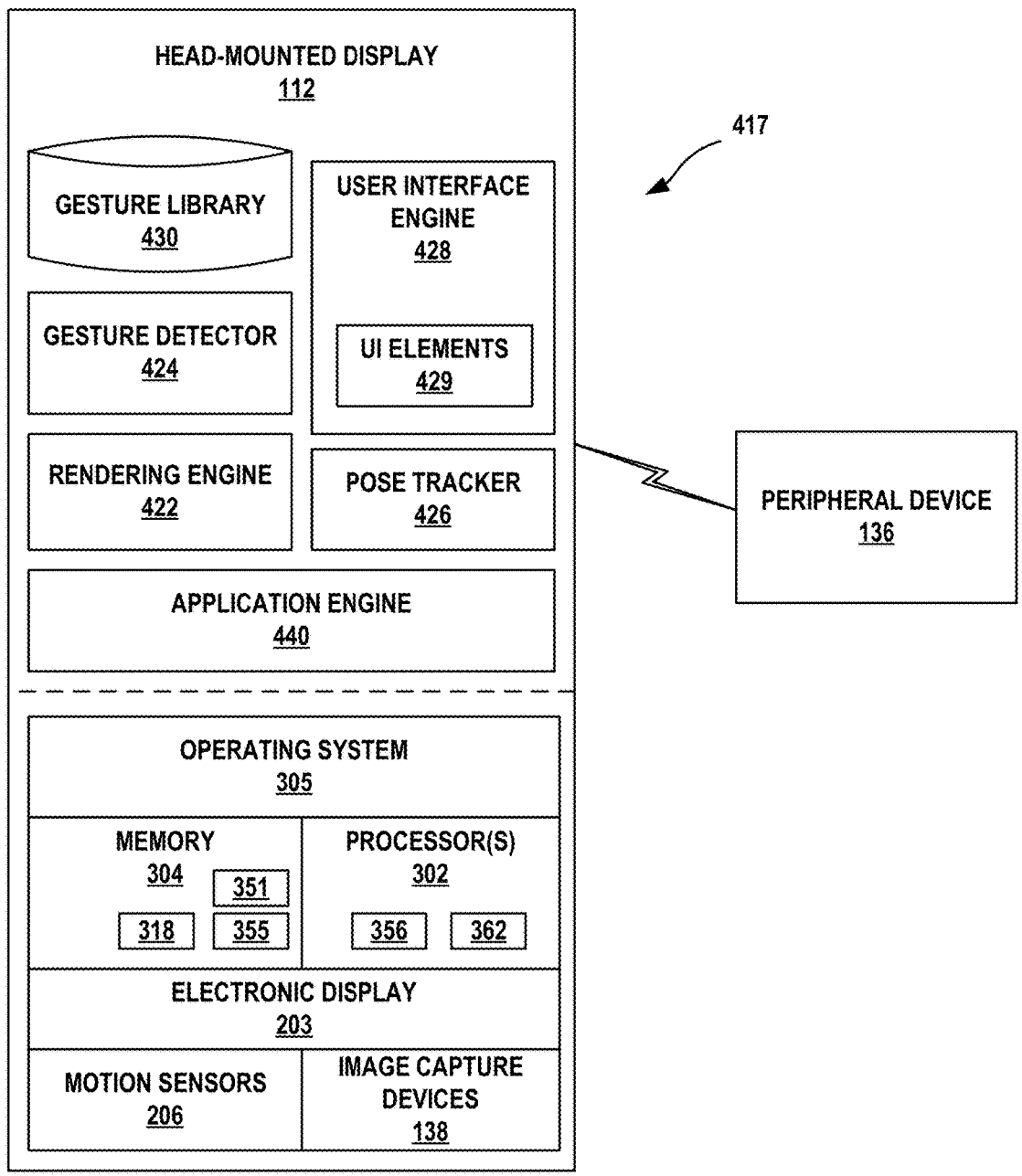
FIG. 4 is a block diagram depicting an example HMD of an artificial reality system, in accordance with the techniques described in this disclosure.

FIG. 4 is a block diagram depicting an example HMD 112 of the artificial reality systems of FIGS. 1A and 1B, in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

Components of peripheral device 136 in FIG. 4 may operate similarly to components of peripheral device 136 in FIG. 3. The techniques described with respect to FIG. 3 and peripheral device 136 may also be implemented in boot processor 356, storage devices 351 and 355, and application processor 362 of processors 302 of HMD 112. When a boot sequence is initiated, peripheral device 136 may perform a pre-boot sequence to put in place defenses to attacks against the boot processor 356 of peripheral device 136 or against critically confidential information stored in storage device 355 within peripheral device 136. Once the mechanisms for detecting and/or defending against attacks on peripheral device 136 are in place, access to the critically confidential information stored in storage device 355 is enabled. Boot processor 356 may then read data from storage device 355 and continue the secure boot sequence.

In some examples, the boot sequence may continue with boot processor 356 of processors 302 of HMD 112 obtaining firmware 318 from a first storage device via a first storage protocol and storing firmware 318 in a second storage device via a second storage protocol. The boot processor 356 may independently validate the firmware as being an authorized version. The boot processor 356 may also validate physical traces between itself and the application processor or between itself and the storage device. In such an example, and in response to validating the firmware, traces, or other properties of the system, the boot processor 356 boots the application processor, which requests the firmware from the SoC. The SoC reads the firmware from the storage device and provides the firmware to the application processor for loading according to the boot sequence.

Figure 5A:
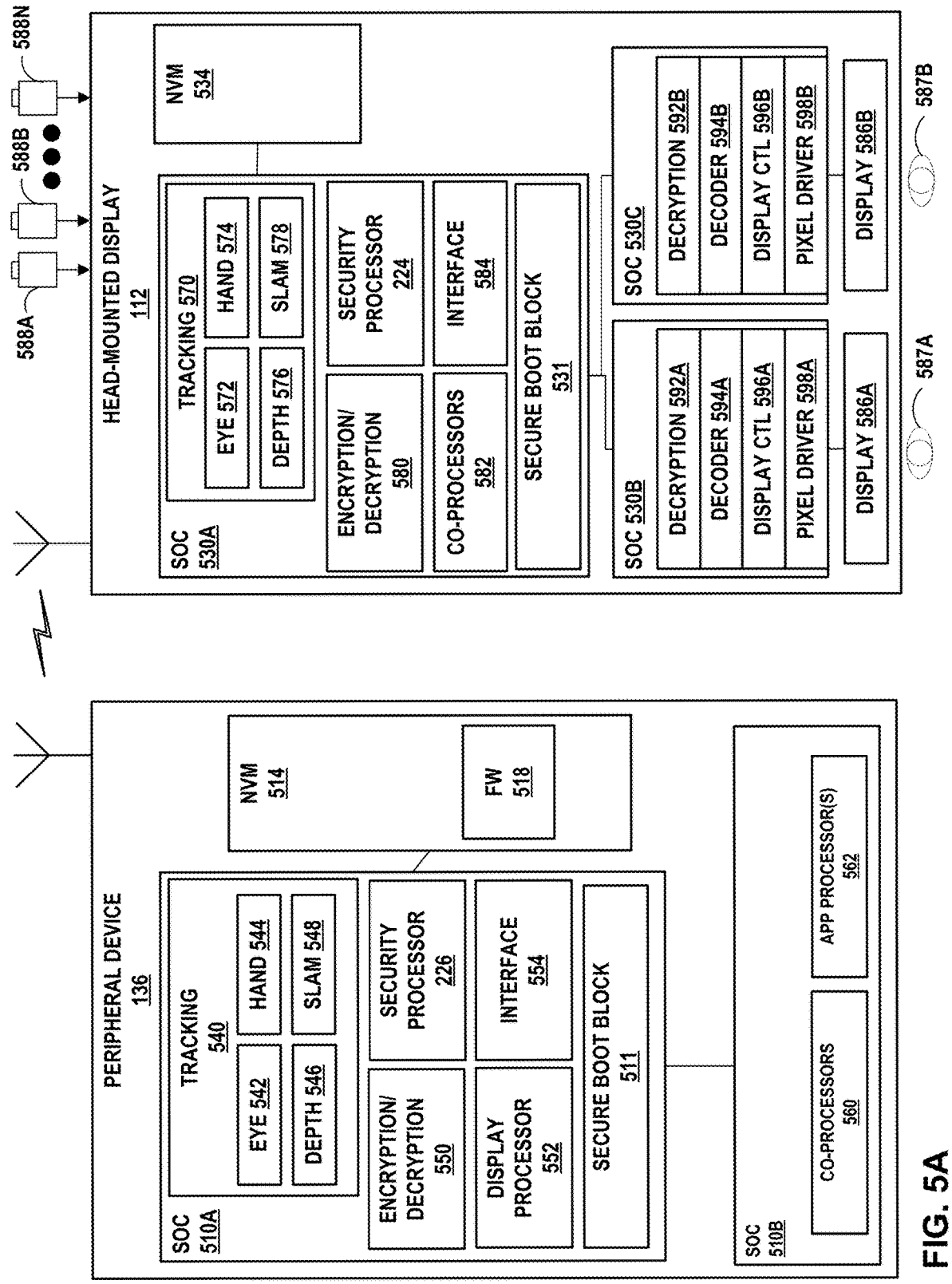
FIG. 5A is a block diagram illustrating an example implementation of a distributed architecture for a multi-device artificial reality system in which one or more devices are implemented using one or more SoC integrated circuits within each device, in accordance with one or more aspects of the present disclosure.

FIG. 5A is a block diagram illustrating an example implementation of a distributed architecture for a multi-device artificial reality system in which one or more devices are implemented using one or more SoC integrated circuits within each device, in accordance with one or more aspects of the present disclosure. In the example of FIG. 5A, one or more devices (e.g., HMD 112 and peripheral device 136) are implemented using one or more System-on-a-Chip (SoC) integrated circuits, in accordance with the techniques described in this disclosure. HMD 112 and peripheral device 136 exchange data through wired and/or wireless communications via a communication link 502. HMD 112 may be an example of any of HMDs 112 of FIGS. 1A-4. HMD 112 may be part of an artificial reality system, such as artificial reality systems 10, 20 of FIG. 1A, 1B, or may operate as a stand-alone, mobile artificial reality system configured to implement the techniques described herein.

In the example of FIG. 5A, HMD 112 includes SoCs 530A-530M (collectively, "HMD SoCs 530"), and non-volatile memory 534. In general, SoCs 530 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components.

In general, the SoCs illustrated in FIG. 5A represent a collection of specialized integrated circuits arranged in a distributed architecture, where each SoC integrated circuit includes various specialized functional blocks configured to provide an operating environment for artificial reality applications. FIG. 5A is merely one example arrangement of SoC integrated circuits. The distributed architecture for a multi-device artificial reality system may include any collection and/or arrangement of SoC integrated circuits.

In the example of FIG. 5A, before peripheral device 136 and HMD 112 may function, each of the SOCs included within peripheral device 136 and HMD 112 must be started or booted. There a number of places during the boot process where one or more of the SoCs described herein could be vulnerable to attack, such as by a malicious actor or process. Such attacks, if successful, may result in data or secret information (e.g., cryptographic keys) being compromised. Alternatively, or in addition, such attacks may result in improper or erroneous operation of one or more components of the SoC. Attacks may take any of a number of forms, including physical intervention attacks (e.g., modifying signals at external pins or sensing or interacting with internal components), voltage glitching attacks, clock or frequency glitching attacks, temperature attacks, or other types of attacks.

Accordingly, before each of SoCs is placed in a position to execute instructions, a secure boot process may be employed to ensure that such attacks are not successful, or at least are less likely to be successful. In general, such attacks on an SoC may occur anywhere between the time from power down of the SoC to the time that the SoC is powered and operating in a steady state functional mode.

Secure boot block 511 of SOC 510A and secure boot block 531 of SOC 530A are described herein as performing a multi-stage boot process to reduce the likelihood of an attack SOCs 510A and 530A. Specifically, secure boot block 511 may perform operations relating to a multi-stage boot process for SOC 510A, whereas secure boot block 531 may perform operations relating to a multi-stage boot process of SOC 530A. Secure boot block 511 may also perform or assist in starting or booting of other SoCs included within peripheral device 136, such as SOC 510B and various components of SOC 510B. Similarly, secure boot block 531 may perform or assist in starting or booting of other SoCs included within HMD 112. However, in other examples, each of SoCs illustrated in FIG. 5A may have its own secure boot block for performing a secure boot process. Such a secure boot process may be consistent with the process described herein with respect to secure boot block 511 and secure boot block 531.

In the example of FIG. 5A, security processor 224 of HMD 112 provides secure device attestation and mutual authentication for HMD when pairing with other devices, e.g., peripheral device 136, that are used in conjunction within the AR environment. When HMD 112 is powered on and performs a secure boot via secure boot block 531 (as further described herein), security processor 224 may authenticate one or more SoCs 530 of HMD 112. When peripheral device 136 is powered on and performs a secure boot via secure boot block 511 (as further described herein), a security processor 226 may authenticate one or more SoCs 510 of peripheral device 136 as application processor 562 loads firmware 518.

In this example, SoC 530A of HMD 112 comprises functional blocks including security processor 224, tracking 570, an encryption/decryption 580, co-processors 582, and an interface 584. Tracking 570 provides a functional block for eye tracking 572 ("eye 572"), hand tracking 574 ("hand 574"), depth tracking 576 ("depth 576"), and/or Simultaneous Localization and Mapping (SLAM) 578 ("SLAM 578"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 588A-588N (collectively, "image capture devices 588"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 570 determines, for example, a current pose for the frame of reference of HMD 112 and, in accordance with the current pose, renders the artificial reality content.

Encryption/decryption 580 is a functional block to encrypt outgoing data communicated to peripheral device 136 or security server and decrypt incoming data communicated from peripheral device 136 or security server. Encryption/decryption 580 may support symmetric key cryptography to encrypt/decrypt data with a session key (e.g., secret symmetric key). For example, when sending the device certificates to the security server via peripheral device 136 for attestation, encryption/decryption 580 encrypts device certificates of SoCs 530A-530C with a first session key (Ski) for securely communicating the device certificates to peripheral device 136. Encryption/decryption 580 also encrypts the device certificates with a public key to securely communicate the device certificates to the security server. In response to receiving a pairing certificate encrypted with the second session key ($S_{k2}$) from peripheral device 136, encryption/decryption 580 decrypts the encrypted pairing certificate using the second session key ($S_{k2}$). In some examples, the security server may digitally sign the pairing certificate by encrypting a hash of the pairing certificate with a private key. In these examples, encryption/decryption 580 verifies the signature using a server public key and verifies the authenticity and integrity of the pairing certificate (e.g., by running the pairing certificate through the same hashing algorithm as the security server).

Co-application processors 582 includes one or more processors for executing instructions, such as a video processing unit, graphics processing unit, digital signal processors, encoders and/or decoders, and/or others.

Interface 584 is a functional block that includes one or more interfaces for connecting to functional blocks of SoC 530A. As one example, interface 584 may include peripheral component interconnect express (PCIe) slots. SoC 530A may connect with SoC 530B, 530C using interface 584. SoC 530A may connect with a communication device (e.g., radio transmitter) using interface 584 for communicating with other devices, e.g., peripheral device 136.

SoCs 530B and 530C each represents display controllers for outputting artificial reality content on respective displays, e.g., displays 586A, 586B (collectively, "displays 586"). In this example, SoC 530B may include a display controller for display 568A to output artificial reality content for a left eye 587A of a user. For example, SoC 530B includes a decryption block 592A, decoder block 594A, display controller 596A, and/or a pixel driver 598A for outputting artificial reality content on display 586A. Similarly, SoC 530C may include a display controller for display 568B to output artificial reality content for a right eye 587B of the user. For example, SoC 530C includes decryption 592B, decoder 594B, display controller 596B, and/or a pixel driver 598B for generating and outputting artificial reality content on display 586B. Displays 568 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 510A and 510B configured to support an artificial reality application. In this example, SoC 510A comprises functional blocks including security processor 226, tracking 540, an encryption/decryption 550, a display processor 552, and an interface 554. Tracking 540 is a functional block providing eye tracking 542 ("eye 542"), hand tracking 544 ("hand 544"), depth tracking 546 ("depth 546"), and/or Simultaneous Localization and Mapping (SLAM) 548 ("SLAM 548"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 Or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 540 determines, for example, a current pose for the frame of reference of peripheral device 136 and, in accordance with the current pose, renders the artificial reality content to HMD 112.

Encryption/decryption 550 encrypts outgoing data communicated to HMD 112 or security server and decrypts incoming data communicated from HMD 112 or security server. Encryption/decryption 550 may support symmetric key cryptography to encrypt/decrypt data using a session key (e.g., secret symmetric key).

Display processor 552 includes one or more processors such as a video processing unit, graphics processing unit, encoders and/or decoders, and/or others, for rendering artificial reality content to HMD 112.

Interface 554 includes one or more interfaces for connecting to functional blocks of SoC 510A. As one example, interface 584 may include peripheral component interconnect express (PCIe) slots. SoC 510A may connect with SoC 510B using interface 584. SoC 510A may connect with one or more communication devices (e.g., radio transmitter) using interface 584 for communicating with other devices, e.g., HMD 112.

As discussed with respect to the example of FIG. 2A, security processor 226 provides secure device attestation and mutual authentication of peripheral device 136 when pairing with devices, e.g., HMD 112, used in conjunction within the AR environment. When peripheral device 136 is powered on and performs a secure boot, security processor 226 may authenticate SoCs 510A, 510B of peripheral device 136 based on the pairing certificate stored in NVM 514. If a pairing certificate does not exist or the devices to be paired have changed, security processor 226 may send to the security server device certificates of SoCs 510A, 510B for attestation.

SoC 510B includes co-application processors 560 and application processors 562. In this example, co-application processors 560 includes various processors, such as a vision processing unit (VPU), a graphics processing unit (GPU), and/or central processing unit (CPU). Application processors 562 may execute one or more artificial reality applications to, for instance, generate and render artificial reality content and/or to detect and interpret gestures performed by a user with respect to peripheral device 136.

Figure 5B:
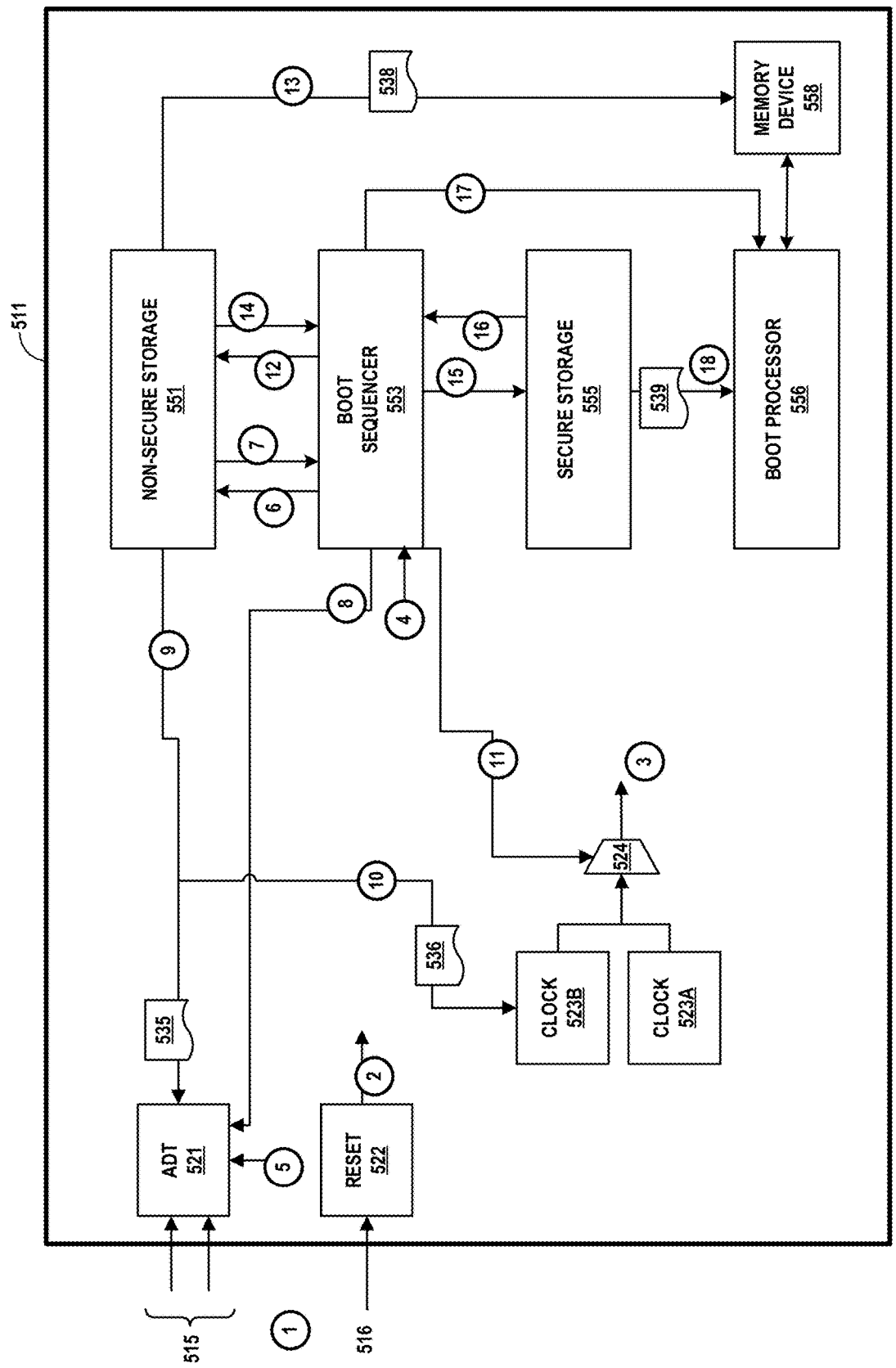
FIG. 5B is a block diagram showing an example implementation of an architecture for a multi-staged boot process, in accordance with one or more aspects of the present disclosure.

FIG. 5B is a block diagram showing an example implementation of an architecture for a multi-staged boot process, in accordance with one or more aspects of the present disclosure. FIG. 5B illustrates secure boot block 511, which may correspond to secure boot block 511 of FIG. 5A, and which may thus represent a boot sequencing system within a SoC that performs operations in accordance with one or more aspects of the present disclosure.

As described herein, a boot sequencing system, such as that implemented by secure boot block 511, may perform certain operations within secure boot block 511 in a specific order. One such order of operations is illustrated in FIG. 5B through numbered steps (e.g., steps 1 through 18). Although FIG. 5B is described with reference to the illustrated ordering, other examples may use a different ordering of steps, such that operations described in connection with FIG. 5B may be merged, performed in a difference sequence, omitted, or may encompass additional operations not specifically illustrated or described.

Although secure boot block 511 of FIG. 5B may correspond to secure boot block 511 of FIG. 5A, descriptions of operations performed by secure boot block 511 of FIG. 5B may also apply in some or all respects to secure boot block 531 of FIG. 5A. Accordingly, operations described herein with respect to secure boot block 511 may therefore also be performed by secure boot block 531 having a similar architecture to secure boot block 511. In general, peripheral device 136 and HMD 112 (and/or each of the SoCs within peripheral device 136 and HMD 112) may each include a secure boot block that operates in a manner that corresponds to the operation of secure boot block 511 and has components similar to secure boot block 511 as described herein with reference to FIG. 5B.

In some examples, secure boot block 511 of FIG. 5B may be a self-contained hardware device having a limited number of input ports. Such input ports, as illustrated in FIG. 5B, may include power inputs 515 and reset input 516. In some examples, operation of secure boot block 511 may depend primarily or only on receiving a reset assertion and one or more voltages at power inputs 515. In the example illustrated in FIG. 5B, secure boot block 511 includes attack detector 521, reset signal generator 522, one or more internal clocks 523, boot sequencer 553, boot processor 556, one or more non-secure storage devices 551, one or more secure storage devices 555, and one or more memory devices 558. Boot processor 556 may correspond to boot processors 356 of FIG. 3 and FIG. 4. Storage device 551 may correspond to storage devices 351 of FIG. 3 and FIG. 4, and storage device 555 may correspond to storage devices 355 of FIGS. 3 and 4.

Attack detector 521 of secure boot block 511 may be a device that is designed to detect behavior or other actions relative to secure boot block 511 that suggest an attempt to compromise secure boot block 511 specifically or SOC 510A generally. In some examples, attack detector 521 may be capable of detecting changes or behavior relating to voltages applied to secure boot block 511, internal or external frequencies that are being used to drive one or more aspects of secure boot block 511, the temperature at which secure boot block 511 is being operated or the ambient temperature, or other environment conditions, inputs, changes, or behavior that could affect secure boot block 511. In some examples, attack detector 521 may be an analog device that accepts as input or operates based on two power inputs, one at 1.8 volts and another at 0.75 volts. In some examples, attack detector 521 may be implemented through circuitry embodied in an off-the-shelf device. In other examples, attack detector 521 may be a module that includes circuitry configured to execute computing instructions to implement attack detection functions.

Attack detector 521 may be programmed to sense one or more of such attacks and take an appropriate action in response to the attack. In some examples, attack detector 521 may take actions that include raising a signal alerting one or more components within secure boot block 511 or elsewhere of the possibility of an attack, disabling one or more components, disconnecting power from one or more components, and/or resetting one or more components. In order for attack detector 521 to accurately sense or detect a wide range of such attacks, attack detector 521 may require configuration using configuration data 535 (e.g., configuration or trim bits). Configuration data 535 may be used to ensure that attack detector 521 is capable of accurately detecting various types of attacks (e.g., voltage, frequency, temperature) and/or to ensure that it is sufficiently sensitive to identifying characteristics of potential attacks. Configuration data 535 may include trim bits and/or other information that can be used to fine-tune the operation of or adjust the sensitivity of attack detector 521. Alternatively or in addition, configuration data 535 may include commands or other information that can be used to enable a more robust mode of operation by the attack detector 521, in which detection of additional types of attacks is possible. Such additional types of attacks may include attacks involving frequency, sequencing, temperature, or other features or characteristics. In some examples, attack detector 521 may operate in a "coarse" mode prior to being configured with configuration data 535, where such a mode provides some detection and/or protection against attacks, but might not be as comprehensive or sensitive as more fine-grained and/or robust modes. In some examples, attack detector 521 may initially operate in the "coarse" mode, and later transition to a more fine-grained mode after being configured with configuration data 535. The course mode may be less capable of detecting some types of attacks (e.g., those relating to voltage or frequency). A robust mode or a more fine-grained mode may be more capable of detecting such attacks, and/or may be capable of detecting additional types of attacks.

Secure boot block 511 may include reset signal generator 522, which may be implemented using one or more components that generate an internal reset signal based on reset input 516. Secure boot block 511 may be capable of operating using the reset signal of reset input 516, but in the example illustrated in FIG. 5B, secure boot block 511 uses reset signal generator 522 to generate an internal reset signal. The internal reset signal is then used within secure boot block 511 and sheltered from outside influences. The internal reset signal generated by reset signal generator 522 may be based on reset input 516, but reset signal generator 522 may filter some changes or input applied to reset input 516, thereby ensuring that the internal reset signal does not change unpredictably, erratically, rapidly, or during vulnerable points in the boot process.

One or more internal clocks 523 may be included within secure boot block 511. In some examples, secure boot block 511 could operate using an external clock. However, in the example of FIG. 5B, internal clocks 523 are used to provide the benefit of isolating clock behavior within secure boot block 511 from external influences. In other words, if a clock is generated outside of secure boot block 511 and used to sequence operations within secure boot block 511, an attacker could conceivably modify, change, or stop such an external clock, and thereby modify operation of secure boot block 511. One or more internal clocks 523 may prevent such an attack by sequencing or otherwise operating components within secure boot block 511 using one or more clocks that cannot be accessed outside secure boot block 511. One or more of internal clocks 523 may require or may operate more regularly if configured by trim information or trim data 536, which may be received from non-secure storage device 551.

Boot sequencer 553 steps through a multi-staged boot process as described herein. Boot sequencer 553 may communicate with various components of secure boot block 511, and may enable, reset, and/or control such components in the manner described herein. In some examples, boot sequencer 553 is clocked by internal clock 523A initially, and then later by internal clock 523B. In general, boot sequencer 553 orchestrates aspects of a multi-stage boot process, which may include a pre-boot process, a secure boot process, and a boot runtime process.

Boot processor 556 may serve as the root of trust for SOC 510A, and may serve as the foundation on which secure operations performed by SOC 510A are performed. Boot processor 556 may use keys to perform cryptographic operations, and boot processor 556 may obtain such keys from secure storage device 555 as further described herein. Also as further described herein, boot processor 556 may be brought out of reset by boot sequencer 553, but such reset typically takes place after one or more of internal clocks 523, attack detector 521, secure storage device 555, and memory device 558 are properly configured and/or accessible. Boot processor 556 may include a processor and/or microcontroller, ROM, and/RAM.

Memory device 558 may be accessed primarily by boot processor 556, and may play a role in the multi-staged boot process. Memory device 558 may store data, such as code, used to boot or start boot processor 556 and to start other components within SOC 510A. Such code may be used to transfer control to firmware for SOC 510A, typically occurring late in the boot process.

Non-secure storage device 551 and secure storage device 555 store information used to perform the multi-staged boot process. In some examples, each of non-secure storage device 551 and secure storage device 555 may be implemented by a one-time programmable memory or read-only memory (ROM) device, which may function an on-die ROM device. In such an example, the information used to perform the multi-staged boot process is encoded or electrically programmed to each ROM device, and once programmed, the data typically cannot be modified. In some cases, such devices are implemented through devices sourced by third party vendors, and such devices are sometimes called one-time programmable macros. In some examples, each of non-secure storage device 551 and secure storage device 555 may depend, for proper operation, on receiving multiple voltages at appropriate ranges. In one example, such voltages must be at or near 1.8 volts and another at 0.75 volts.

In some examples, if voltages applied to such storage devices are not in the proper range, each of non-secure storage device 551 and secure storage device 555 may output a default value, rather than outputting the data stored within the device. For instance, in some examples, each of non-secure storage device 551 and secure storage device 555 may be designed such that if the voltages provided to the storage devices is set to ground, each storage device will output only 0 values (which may be the same values outputted by a storage device that has not yet been electrically programmed). Similarly, if one or more of the voltages provided to the storage devices exceeds the appropriate or expected voltages that are to be applied to the storage devices, the storage devices may be designed to output only 1 values.

Non-secure storage device 551 stores, in the example illustrated, "non-secure" information used during the boot process. Such "non-secure" information may include control or configuration information for configuring one or more devices or components within secure boot block 511. While information stored within might not be "secret" information in the sense that its disclosure would affect the operation or security of secure boot block 511 or SOC 510A as a whole, it may nevertheless be important to protect the integrity of such information. In other words, secure boot block 511 may be designed to ensure that information stored within non-secure storage device 551 can be read reliably and accurately, and to ensure that it would be difficult to modify data after it is read from non-secure storage device 551.

Secure storage device 555 stores, in the example illustrated, "secure" information that is used during the boot process. Such "secure" information may include code, cryptographic keys, and other information that is used to configure or operate one or more devices or components within secure boot block 511. Maintaining the confidentiality of the information stored within secure storage device 555 is important to prevent corruption of the operation of secure boot block 511 or SOC 510A, and to avoid circumventing secure communications, digital rights management, and other processes that may rely on confidential cryptographic keys and other information stored within secure storage device 555.

Both non-secure storage device 551 and secure storage device 555 store important information, and in particular, secure storage device 555 may be used to store critically confidential information, such as cryptographic keys. Accordingly, attack scenarios may involve applying various voltages to block 511 in an attempt to read the values stored within storage device 555. As previously noted, however, each of non-secure storage device 551 and secure storage device 555 may be designed to output a default value when the voltages applied to the storage devices are not within the appropriate range. One challenge this raises is distinguishing such default values appropriately provided by the storage device (corresponding to a reset or initial state of the storage devices) from an attempt to attack the storage devices. Accordingly, particularly when non-secure storage device 551 and secure storage device 555 are started during reset, it may be important for attack detector 521 to be capable of performing voltage attack detection. If attack detector 521 can perform voltage attack detection, it may be possible to accurately distinguish between startup or initial states of storage devices 551 and 555 and potential attempts to compromise one or more of storage devices 551 and 555.

Another attack scenario, particularly in implementations in which components of secure boot block 511 are clocked using an external clock, involves halting operation of the clock at different points during the boot sequence. By stopping the clock, it may be possible to evaluate, during clock stoppage, electrical properties of components within secure boot block 511 (and/or within non-secure storage device 551 or secure storage device 555). Such electrical properties may provide information about the values that are stored in storage devices within secure boot block 511. In other words, if the clock used by secure boot block 511 can be stopped, secret information, such as that stored in secure storage device 555, could be compromised. Accordingly, before enabling access to the data stored within secure storage device 555, it may be important to ensure attack detector 521 is capable of performing frequency attack detection.

In FIG. 5B, and in accordance with one or more aspects of the present disclosure, secure boot block 511 may commence operations in response to one or more external signals. For instance, in an example that can be described with reference to FIG. 5B, attack detector 521 and reset signal generator 522 detect external signals, which may include one or more power inputs 515 and reset input 516 (see step "1" in FIG. 5B). In some examples, operations performed by secure boot block 511 may be initiated in response to simply an external power supply and an external reset assertion or reassertion. Attack detector 521 may use power inputs 515 to power devices and components of secure boot block 511 by channeling power from power input 515 to such devices and components. In other examples, however, a different device may feed power from power inputs 515 to devices or components of secure boot block 511. Reset signal generator 522 translates reset input 516 into an internal reset signal (step 2 in FIG. 5B) and uses this internal reset signal to start internal clock 523A. Internal clock 523A generates an internal clock signal (step 3 in FIG. 5B) that is used to sequence at least some operations within secure boot block 511. Specifically, internal clock 523A is used to clock boot sequencer 553, which orchestrates a number of operations within secure boot block 511. In the example illustrated in FIG. 5B, internal clock 523B is started after internal clock 523A, and is not initially used to clock any of the components within secure boot block 511. Mux 524 may be used to select internal clock 523A for clocking components of secure boot block 511.

Secure boot block 511 may start boot sequencer 553. For instance, still referring to the example being described with reference to FIG. 5B, reset signal generator 522 of secure boot block 511 applies internal reset signal to boot sequencer 553, causing boot sequencer 553 to start sequencing boot operations, clocked by internal clock 523A (step 4 of FIG. 5B). Boot sequencer 553 thus begins to keep track of and orchestrates the steps performed by secure boot block 511 during a pre-boot and boot stage.

Secure boot block 511 may start attack detector 521. For instance, again referring to the example being described with reference to FIG. 5B, secure boot block 511 initiates or starts attack detector 521 (step 5 in FIG. 5B). Starting attack detector 521 could occur before or after boot sequencer 553 starts, or in some examples, at the same time that boot sequencer 553 starts. When initiated, and before being configured, attack detector 521 may operate in a limited mode, detecting certain voltage attacks and taking actions in response to detecting such attacks. Attack detector 521 may be capable of performing other attack detection operations, such as those relating to frequency, sequencing, timing, temperature, and others, but such detection operations may be performed only on a limited basis after initial power-up, if at all, before attack detector 521 has been configured. In the example being described, when attack detector 521 is powered up, attack detector 521 initially performs some level of voltage attack detection operations, but is not yet configured to detect frequency-related or other attacks.

Secure boot block 511 may enable access to non-secure storage device 551. For instance, still referring to the example being described with reference to FIG. 5B, boot sequencer 553 starts sequencing through a pre-boot operation by signaling non-secure storage device 551 to enable sensing of information stored within non-secure storage device 551 (step 6). Boot sequencer 553 later receives a responsive signal from non-secure storage device 551, and determines that the signal is an indication that non-secure storage device 551 has enabled sensing of information stored within non-secure storage device 551 (step 7). Once non-secure storage device 551 has enabled sensing of information, attack detector 521 is able to read configuration data 535 previously stored within non-secure storage device 551.

Secure boot block 511 may configure attack detector 521. For instance, continuing with the example being described, boot sequencer 553 outputs a signal to attack detector 521 (step 8). Attack detector 521 detects the signal and interprets it as command to configure or fine-tune its attack detection mechanisms. To configure or fine-tune its attack detection mechanisms, attack detector 521 uses configuration data 535 obtained from non-secure storage device 551 (step 9). For example, attack detector 521 uses configuration data 535 to fine-tune its voltage attack detection capabilities, which were previously enabled soon after power was applied, but in a more limited or coarse mode. Attack detector 521 also uses configuration data 535 to configure and enable frequency, sequencing, temperature, and/or other attack detectors.

Secure boot block 511 may configure internal clock 523B. For instance, still continuing with the example being described with reference to FIG. 5B, boot sequencer 553 also enables sensing of trim data 536 from non-secure storage device 551. Internal clock 523B receives trim data 536, and uses the trim data to configure and/or trim itself to operate at a more accurate frequency, or within a narrower frequency range, than internal clock 523A (step 10). In some examples, this second internal clock 523B has not yet been started, so it can be trimmed to operate at the more accurate frequency specified by trim data 536. Trim data 536 may, in some examples, enable, disable, and/or adjust capacitance and/or inductance components that operate in connection with an oscillator to cause the oscillatory frequency to operate within a specific and/or narrower range. Since internal clock 523A is already live and operating at this point, it is difficult or impossible to effectively perform trimming operations on internal clock 523A. Once internal clock 523B is configured, boot sequencer 553 starts internal clock 523B and causes mux 524 to select internal clock 523B (step 11). Once started and selected, internal clock 523B is thereafter used to clock components within secure boot block 511. At this point (at step 11), since a more accurate internal clock 523B is operating within secure boot block 5111 and since attack detector 521 has been fully enabled, secure boot block 511 may be operating at in a more secure and stable manner than during earlier operations. This more secure and stable operations may thereafter more effectively insulate secure boot block 511 from attacks, thus making access to more sensitive data within secure boot block 511 less of a security risk.

Secure boot block 511 may configure memory device 558. For instance, again referring to the example being described with reference to FIG. 5B, boot sequencer 553 outputs a sense signal to non-secure storage device 551 (step 12). Non-secure storage device 551 enables sensing of configuration data 538 (e.g., repair bits) that can be used to configure memory device 558 (e.g., associated with boot processor 556) to operate reliably. Memory device 558 uses configuration data 538 to configure memory device 558 (step 13). Non-secure storage device 551 signals to boot sequencer 553 that configuration data 538 is available or has been sensed or read (step 14).

Secure boot block 511 may enable boot processor 556 to access sensitive data from secure storage device 555. For instance, again referring to FIG. 5B, boot sequencer 553 outputs a sense signal to secure storage device 555 (step 15). Secure storage device 555 enables sensing of data 539 (e.g., reading of information) from within secure storage device 555. In the example being described, data 539 may contain critically confidential information that should not be made available outside of secure boot block 511. Secure storage device 555 signals to boot sequencer 553 that sensing is enabled (step 16). Since attack detector 521 is operating in a robust mode, and since internal clock 523B is used to clock components of secure boot block 511 at a precise frequency, accessing data 539 from secure storage device 555 is considered sufficiently safe. Accordingly, at this point, boot sequencer 553 brings boot processor 556 out of reset (step 17), to start a secure boot stage. In such a stage, boot processor 556 boots using data 539 and information read from memory device 558.

In some examples, boot processor 556 may itself perform a multi-stage secure boot sequence. For instance, still referring to FIG. 5B, boot processor 556 may read code for an initial secure boot stage (e.g., an "fboot" stage) from a first storage device. Thereafter, boot processor 556 may read code for a second secure boot stage (e.g., an "sboot" stage) from a second storage device. In some examples, the fboot stage may execute validated, secure firmware. The sboot stage may involve booting up collateral for the rest of SOC 510A. During an additional boot stage following the fboot and sboot stages, remaining components of SOC 510A may be brought out of reset, and control may be transferred to firmware 518 for SOC 510A in the manner described in U.S. patent application Ser. No. 16/795,254, filed Feb. 19, 2020, and entitled "Artificial Reality System With Verified Boot Sequences."

In some examples, once boot sequencer 553 is brought out of reset, boot sequencer 553 may perform additional operations at various points in the sequence illustrated in FIG. 5B. One such operation may involve determining whether to enable a low-latency path for testing operations during design or debug of secure boot block 511. In other words, during design or debug of secure boot block 511, it may be desirable to operate at least some aspects of secure boot block 511, for testing purposes, without implementing all security and/or attack detection functions that are described herein. If operation of secure boot block 511 is possible without such security features, some debugging operations relating to secure boot block 511 may be more efficiently performed. However, providing a way to enable non-secure access to features of secure boot block 511 may present a potentially exploitable way to circumvent security built into secure boot block 511. Accordingly, the benefits of enabling such a low-latency path for testing operations is preferably balanced against the potential security risks of such a path.

Decision or control points for determining whether to enable test operations may occur during various points in the sequence illustrated in FIG. 5B. One such decision or control point may occur when reading information from non-secure storage device 551, at or about steps 9 and 10.

Figure 6:
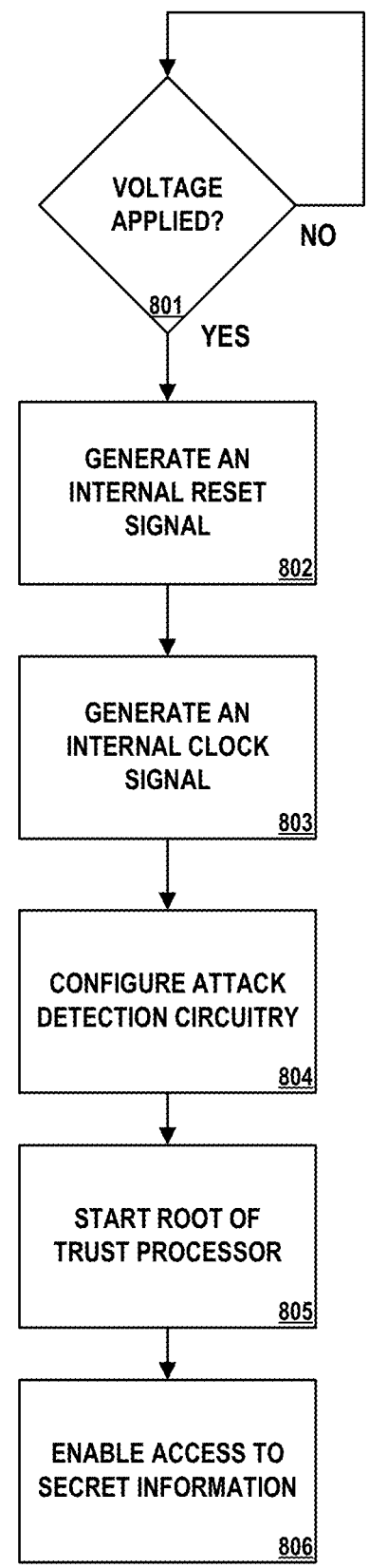
FIG. 6 is a flow diagram illustrating operations performed by an example secure boot block in accordance with one or more aspects of the present disclosure.

FIG. 6 is a flow diagram illustrating operations performed by an example secure boot block in accordance with one or more aspects of the present disclosure. FIG. 6 is described below within the context of secure boot block 511 of FIG. 5B. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the process illustrated in FIG. 6, and in accordance with one or more aspects of the present disclosure, secure boot block 511 may determine whether a voltage and reset assertion has been applied (801). For example, with reference to FIG. 5B, external pins of secure boot block 511 detect voltages and a reset signal. In some examples, attack detector 521 of secure boot block 511 detects a plurality of voltages applied to its inputs. The voltages may be fed by attack detector 521 (or through other means) to other components of secure boot block 511. Reset signal generator 522 may detect a reset signal applied to its inputs. Once a voltage and a reset signal has been detected, a pre-boot sequence is initiated (YES path from 801).

Secure boot block 511 may generate an internal reset signal (802). For example, again referring to FIG. 5B, and responsive to detecting an external reset assertion, reset signal generator 522 generates an internal reset signal that can be used to start or reset components within secure boot block 511. In some examples, the internal reset signal is sheltered to some extent from outside influences or changes to the external reset input, thereby ensuring that the internal reset signal does not change unpredictably, erratically, rapidly, or during vulnerable points in the boot process.

Secure boot block 511 may generate an internal clock signal (803). For example, reset signal generator 522 may use the internal reset signal to start internal clock 523A. Internal clock 523A may generate an internal clock signal that is used to sequence at least initial operations within secure boot block 511. Specifically, internal clock 523A can be used to clock boot sequencer 553, which orchestrates a number of operations within secure boot block 511.

Secure boot block 511 may configure attack detection circuitry (804). For example, again referring to FIG. 5B, secure boot block 511 may initiate or start attack detector 521. When initiated, and before being configured, attack detector 521 may operate in a limited mode, detecting certain voltage attacks and taking actions in response to detecting such attacks. Boot sequencer 553 may signal non-secure storage device 551 to enable sensing of configuration data 535 for attack detector 521. Boot sequencer 553 may cause attack detector 521 to read configuration data 535, thereby enabling attack detector 521 to both enable and fine-tune its attack detection mechanisms. For example, attack detector 521 may use configuration data 535 to fine-tune its voltage attack detection capabilities, which might have been previously enabled soon after power was applied, but in a more limited or coarse mode. Attack detector 521 may also use configuration data 535 to configure and enable frequency, sequencing, temperature, and/or other attack detectors.

Secure boot block 511 may start a root of trust processor (805). For example, once attack detection mechanisms provided by attack detector 521 are in place and operational, boot sequencer 553 may reset and start boot processor 556.

Secure boot block 511 may enable access to secret information (806), after attack detection circuitry is configured. For example, again referring to FIG. 5B, boot sequencer 553 outputs a sense signal to secure storage device 555. Secure storage device 555 enables sensing of data 539 from within secure storage device 555 by boot processor 556. Boot processor 556 uses data 539 during the boot process.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. A method comprising:
   receiving, by a boot sequencing system and on a port, a voltage;
   responsive to receiving the voltage on the port, generating, by the boot sequencing system, an internal reset signal and a first internal clock signal from a first clock source;

configuring, by the boot sequencing system, attack detection circuitry based on configuration information accessed from a first storage device;
after configuring the attack detection circuitry, starting, by the boot sequencing system, a root of trust processor to initiate a boot sequence;
configuring, by the boot sequencing system, a second internal clock signal from a second clock source based on trim information accessed from the first storage device;
clocking, by the boot sequencing system, the root of trust processor using the second internal clock signal; and
enabling access, by the root of trust processor during the boot sequence, to information stored in a second storage device.

2. The method of claim 1, wherein the second internal clock signal operates in a narrower frequency range than the first internal clock signal.

3. The method of claim 1, wherein configuring the second internal clock signal includes:
adjusting the second internal clock signal to operate within a narrower frequency range.

4. The method of claim 1, wherein configuring the attack detection circuitry includes adjusting, based on the configuration information, the sensitivity of the attack detection circuitry.

5. The method of claim 1, wherein configuring the attack detection circuitry includes enabling detection of at least one of:
frequency, sequencing, or temperature attacks.

6. The method of claim 1, wherein the information in the second storage device includes cryptographic keys.

7. The method of claim 1, further comprising:
ensuring, by the boot sequencing system, integrity of information stored in the first storage device.

8. The method of claim 1, further comprising:
ensuring, by the boot sequencing system, both integrity and confidentiality of information stored within the second storage device.

9. The method of claim 1, further comprising:
enabling, by the boot sequencing system, a low latency access to the root of trust processor for testing purposes.

10. The method of claim 1, further comprising:
configuring, by the boot sequencing system and using repair information stored within the first storage device, a memory device accessible by the root of trust processor.

11. A method comprising:
configuring, by a boot sequencing system, attack detection circuitry based on configuration information accessed from a first storage device;
after configuring the attack detection circuitry, starting, by the boot sequencing system, a root of trust processor to initiate a boot sequence;
enabling access, by the root of trust processor during the boot sequence, to information stored in a second storage device; and
prior to configuring the attack detection circuitry based on the configuration information, enabling, by the boot sequencing system, operation of the attack detection circuitry to monitor for voltage glitching attacks.

12. A system comprising:
a processor;
attack detection circuitry;
a first storage device;
a second storage device; and
a boot sequencer configured to:
receive, on a port, a voltage;
responsive to receiving the voltage on the port, generate an internal reset signal and a first internal clock signal from a first clock source;
configure the attack detection circuitry based on information accessed from the first storage device;
after configuring the attack detection circuitry, start the processor;
configure a second internal clock signal from a second clock source based on trim information accessed from the first storage device; and
clock the processor using the second internal clock signal; and
enable access, by the processor, to secure data stored in the second storage device.

13. The system of claim 12, wherein to configure the attack detection circuitry, the boot sequencer is further configured to:
enable the attack detection circuitry to operate in an initial mode; and
configure, based on the information accessed from the first storage device, the attack detection circuitry to operate in a more robust mode than the initial mode.

14. The system of claim 13, wherein the more robust mode enables detection of frequency attacks.

15. The system of claim 12, wherein the processor is a root of trust processor for a system on a chip.

16. A system comprising:
a first clock;
a second clock;
attack detection circuitry;
a storage device; and
a boot sequencer configured to:
configure, while being clocked by the first clock from a first clock source, the attack detection circuitry based on configuration information stored in the storage device,
configure, while being clocked by the first clock, the second clock from a second clock source based on trim information stored in the storage device, and
after configuring the second clock, select the second clock for use in further boot sequencing operations.

17. The system of claim 16, wherein the system further comprises a root of trust processor, and wherein the boot sequencer is further configured to:
after configuring the attack detection circuitry, start the processor.

18. The system of claim 17, wherein the storage device is a first storage device, wherein the system further comprises a second storage device, and wherein the boot sequencer is further configured to:
after configuring the attack detection circuitry, enable access, by the processor, to secure data stored in the second storage device.

* * * * *